United States Patent [19]
Debrunner et al.

[11] 3,937,943
[45] Feb. 10, 1976

[54] DIGITAL SIGNAL AVERAGER WITH LOGARITHMIC TIME BASE

[75] Inventors: Peter Debrunner; Hans Frauenfelder, both of Urbana, Ill.

[73] Assignee: University of Illinois Foundation, Urbana, Ill.

[22] Filed: Aug. 29, 1974

[21] Appl. No.: 501,798

[52] U.S. Cl. ............ 235/183; 235/152; 235/151.3; 235/197
[51] Int. Cl.² .......................................... G06G 7/18
[58] Field of Search ........... 235/183, 181, 193, 197, 235/150.51, 150.53, 151.35, 151.3, 152, 164, 156, 168; 328/145; 340/347 NT; 324/99 D, 132

[56] References Cited
UNITED STATES PATENTS

| | | | |
|---|---|---|---|
| 3,182,181 | 5/1965 | Schumann | 235/164 |
| 3,484,591 | 12/1969 | Trimble | 235/152 |
| 3,576,985 | 5/1971 | Lawrence | 235/181 |
| 3,598,980 | 8/1971 | Lawrence et al. | 235/181 |
| 3,705,297 | 12/1972 | John | 235/152 X |

Primary Examiner—Joseph F. Ruggiero
Attorney, Agent, or Firm—Merriam, Marshall, Shapiro & Klose

[57] ABSTRACT

Method and apparatus for enabling the observation of a physical reaction occurring over many orders of magnitude in time including sensing information during a kinetic action and providing a corresponding output signal, integrating the output signal over periodic linear time segments, converting the information into digital form, and averaging the periodic information samples over exponentially increasing time intervals, each containing a plurality of said linear time segments. A digital signal averager with logarithmic time base in which analog signal information derived for instance during a physical reaction is converted into digital form in periodic samples of discrete linear time intervals, and including means for summing the samples over time intervals increasing by a fixed power, for instance two, and means for dividing the sum for each of the increasing time intervals by the number of linear time intervals in each of the increasing time intervals.

9 Claims, 5 Drawing Figures

DIGITAL SIGNAL AVERAGER WITH LOGARITHMIC TIME BASE

This invention relates to methods and apparatus for measuring physical reactions and in particular to the measurement of reactions occurring over several time decades.

In many physical reactions, it is desirable to measure and analyze the kinetics of the reaction extending over relatively long time periods. However, presently available apparatus and techniques are not well suited for the study of such reactions. For instance, in a flash photolysis system, photo dissociation is induced in a subject sample by a light flash and the resulting photo dissociation is detected by a photo multiplier. Normally, the photo multiplier output is fed into a storage oscilloscope and the data taken from the scope tracing. The time bases of oscilloscopes are linear, however. Thus, the observation of a process or physical reaction that extends over many orders of magnitude in time presents problems in that in any one observation after a flash, only a limited range in time, at most two decades, can be observed well.

Therefore, data from a series of flashes must be pieced together in order to get the entire information and measurements concerning the subject physical reaction being investigated. Such an approach is wasteful, time consuming, and furthermore introduces errors because of the required difficult matching of the individual output curves resulting from the respective light flashes.

SUMMARY OF THE INVENTION

In accordance with the principles of the present invention, there is provided method and apparatus for enabling the observation of a physical reaction over several decades in time.

In accordance with one aspect of the invention, a physical reaction is sampled and the resulting sampled output is provided in periodic, discrete time intervals. The periodic sampled output is then averaged over ever-increasing time intervals which are exponentially related to the initial sample intervals. This provides the desired ability to measure not only the rapidly occurring transient conditions of a physical reaction, but also one which extends over several time decades.

In accordance with another aspect of the invention, there is provided a signal averager capable of digitizing an analog signal that occurs over many decades in time. The averaging is done in the following manner: (1) initially, an analog signal, such as one resulting from a sampled physical reaction, is periodically integrated over fixed time segments (of discrete length); (2) the integrated analog output is then converted into digital form at the end of each discrete time interval; and (3) summing the converted digital signal over a respective second group of time intervals increasing exponentially, (for instance) by powers of two, and dividing by the number of linear time segments in each respective second group of time intervals. There is thus provided a digital signal averager with logarithmic time base.

DETAILED DESCRIPTION

Figure 1:
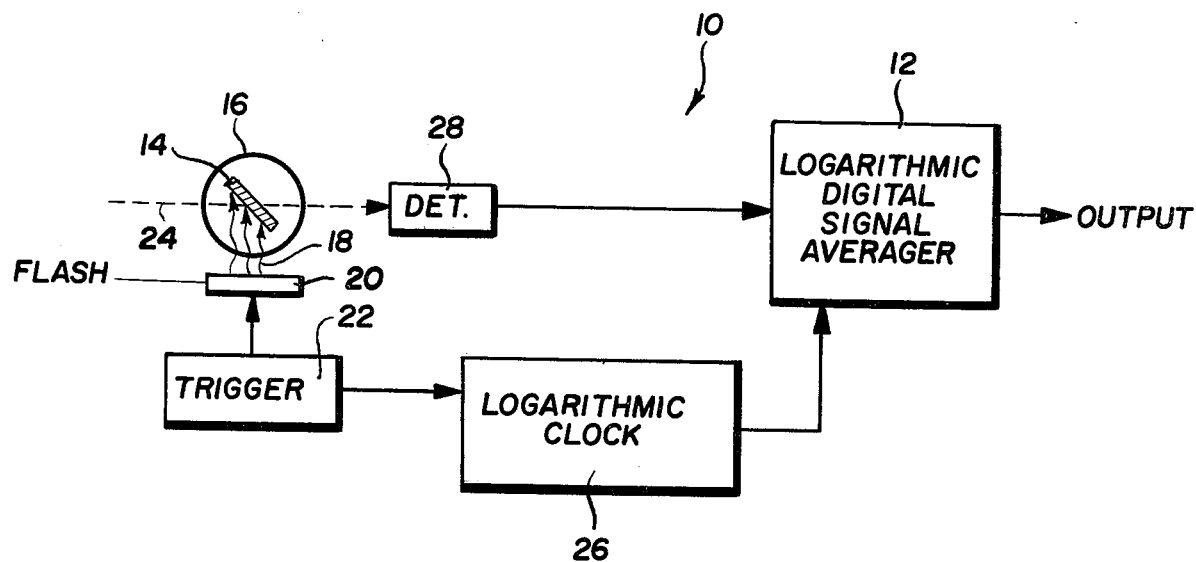
FIG. 1 is a block diagram of a logarithmic digital signal averager in accordance with one aspect of the invention utilized in accordance with the method aspect of the present invention for measuring the kinetic actions occurring in a physical reaction.

Referring now to FIG. 1, there is illustrated measuring apparatus 10 utilizing a logarithmic digital signal averager 12 for measuring the kinetics of a physical reaction occurring over several time decades in accordance with another aspect of the invention. In the illustration of FIG. 1, the measuring apparatus 10 is applied to the study of biological molecules and in particular to the kinetic action occurring in an atom-molecule binding process. The sample 14 under investigation is placed in a cryostat 16 having optical windows. Photo dissociation is induced by a flash 18 from flash lamp 20 initiated by the trigger 22. The subsequent rebinding of sample 14 following dissociation is observed optically with a light beam 24 having a wave-length corresponding to the absorption peak of the rebinding of the sample 14 under investigation. The measuring apparatus 10 enables the observation of the kinetic actions occurring during the rebinding over at least seven decades in time.

The trigger 22 which releases the flash also at the same time starts a logarithmic clock 26. A photo multiplier detector 28 detects the transmitted beam resulting from the light beam 24 passing through sample 14 and thus directly observes the kinetic action during the rebinding process. The output of detector 28 is coupled into the logarithmic digital signal averager 12. After triggering, the logarithmic clock 26 begins to emit signals in ever-increasing time intervals. The first interval has a length $\Delta$, the second interval $2\Delta$, the third $2^2\Delta$, and the $n$-th $2^{n-1}\Delta$. The output from the photo multiplier detector 28 is first converted into digital form and then summed over a given interval. The sum over the $n$-th interval is divided by $2^{n-1}$ and the result is provided at the output of logarithmic averager 12.

As an example, the system can be provided to measure over 19 intervals. If the first interval has a length of $\Delta = 1$ msec, the 19th has a length of
$2^{19-1}\Delta$ msec = 262 seconds,
and the entire measurement extends over a time of 524 seconds. Thus, after a flash, signals derived from photo multiplier detector 28 can be observed in the time range from about 1 microsecond to nearly 1000 seconds in one run with the apparatus of FIG. 1.

Figure 2:
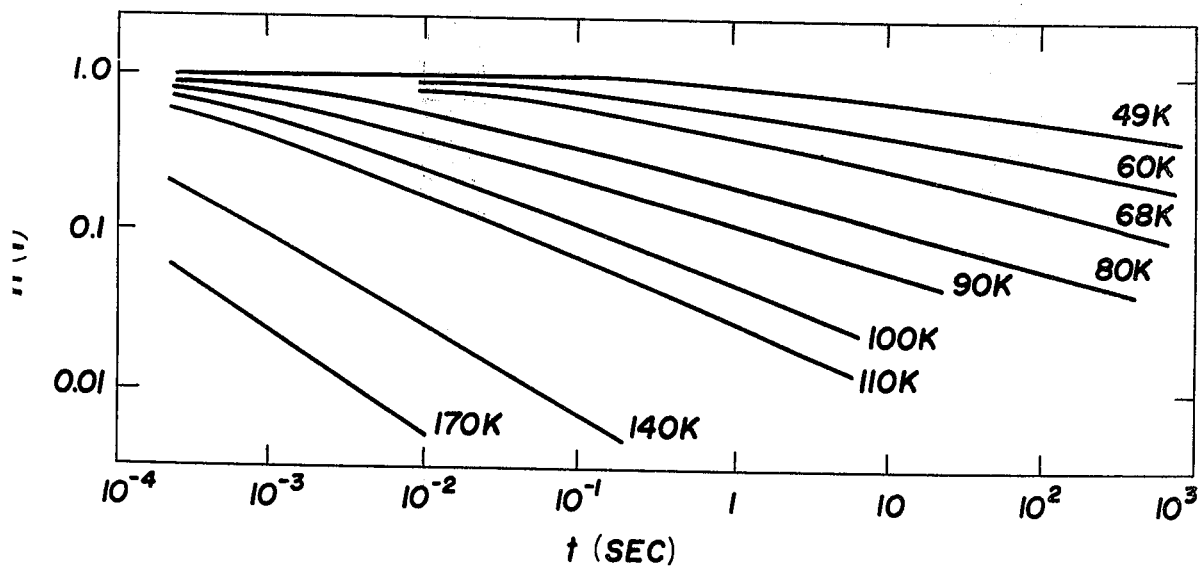
FIG. 2 represents the output measurement results derived in measuring the physical reactions of FIG. 1 over several time decades.

Reference may be made to FIG. 2 wherein there is illustrated a set of typical data where, for instance, $H(t)$ denotes the fraction of myoglobin molecules that have not rebound with carbon monoxide at the time ($t$) after the flash. In FIG. 2, the log $H(t)$ is plotted versus log $t$. Therefore, the curves in FIG. 2 illustrate the binding of carbon monoxide to myoglobin in the temperature range between about 40°K and 200°K over the several decades herein noted.

Figure 3:
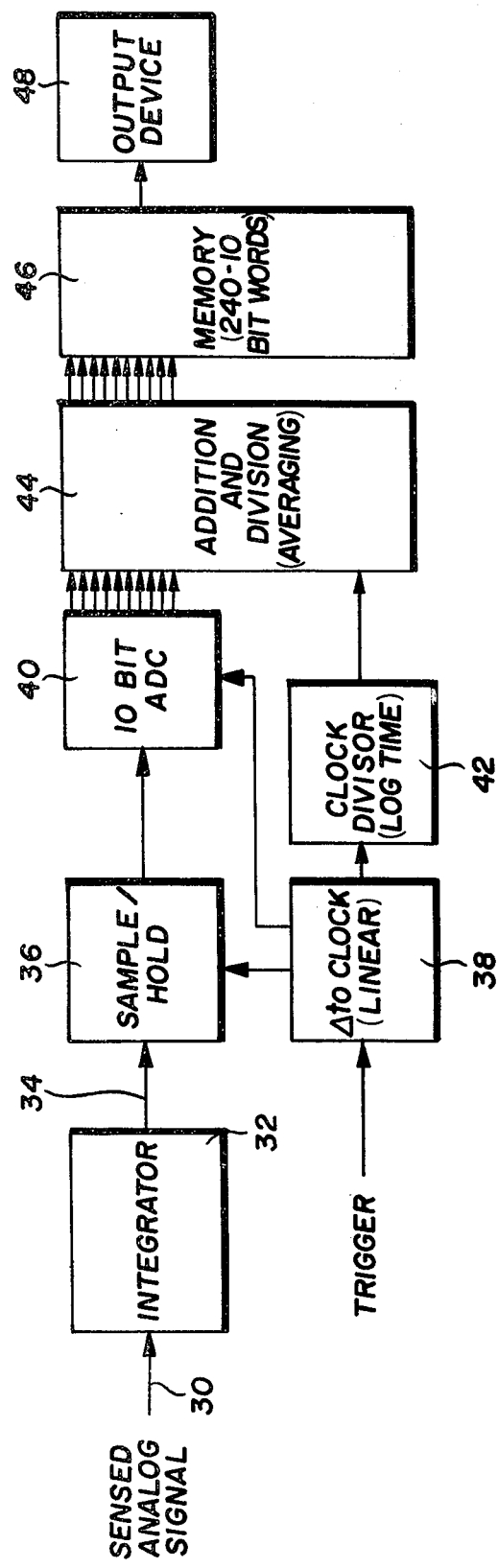
FIG. 3 is a block diagram of a logarithmic signal averager apparatus in accordance with one aspect of the present invention capable of measuring an input signal over several time decades.

Referring now to FIG. 3, there is illustrated in a more specific block diagram, the individual components and functions provided for the logarithmic digital signal averager in accordance with the present invention. The analog signal under observation resulting from kinetic processes occurring during a physical reaction are coupled on a line 30 to an integrator 32. The integrator 32 includes a high input impedance and a suitable time constant to smooth the analog signal input and provide a corresponding analog signal output on line 34, which is coupled to a sample/hold unit 36. The sample/hold circuit 36 samples the input analog signal on line 34 at a rate determined by a linear clock 38 and maintains the sampled analog signal constant for digital conversion via an analog to digital converter 40. The analog to digital converter 40 converts the sampled analog signal input to digital form every $\Delta t_o$ which is supplied by the constant frequency clock 38.

A clock divisor 42 groups the constant frequency pulses from clock 38 into ever-increasing time intervals or segments, $\Delta t_n = 2^{n-1} \Delta t_o$. An averaging unit 44 functions in response to the log time output of clock divisor 42 so as to sum the digital input for a certain number of linear time intervals and then divides the sum by the number of intervals summed over as can be seen more clearly by referring to the time diagram of FIG. 4.

Figure 4:
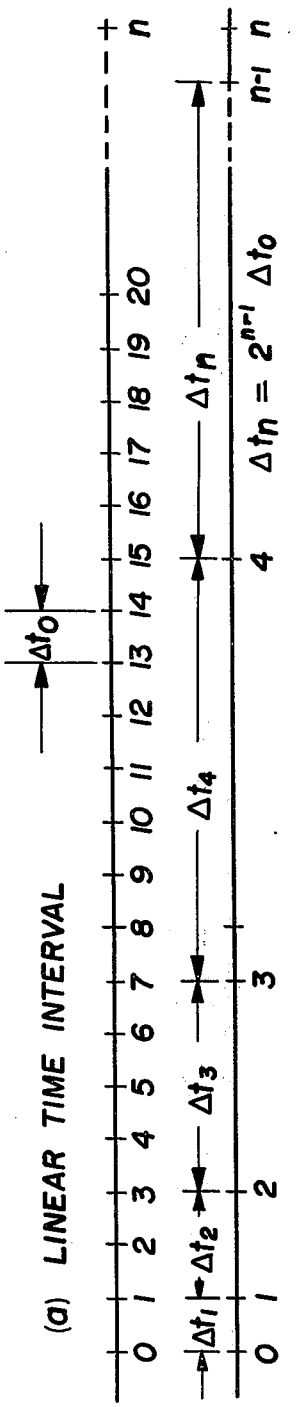
FIG. 4 is a time diagram useful in the description of the present invention and illustrating the linear time intervals and the logarithmic time intervals; and, FIG. 5 is a detailed apparatus block diagram illustrating the logarithmic digital signal averager apparatus aspect of the present invention.

In FIG. 4, the linear time intervals marked 1, 2, 3, etc. correspond to the intervals provided by the constant frequency clock 38. In the same figure, the ever-increasing time intervals or segments $\Delta t_n$ provided by the log time clock divisor 42 have been marked for convenience as $t_1$, $t_2$, $t_3$, etc. Thus, in the first log time interval, one linear time interval is averaged by summing and dividing in unit 44 with a resulting output being placed in memory 46. During the second log time interval, as is shown in FIG. 4, the result of two linear time intervals is averaged and placed in the memory. In the third log time interval, the result of four linear time intervals are averaged; during the fourth log time interval, the results of eight linear time intervals are averaged, etc. Thus, the average over the $n$-th interval is determined by summing the output of analog to digital converter 40 over $2^{n-1}$ consecutive segments of time length $\Delta t_o$ and simultaneously dividing by $2^{n-1}$.

The memory 46 stores the final averaged values in ten-bit words per log time interval. That is, each ten-bit word represents the averaged values during a certain interval. The interval size increases as time gets longer. The output of memory 46 is then coupled to an output device 48 such as a teletype unit or a computer.

Figure 5:
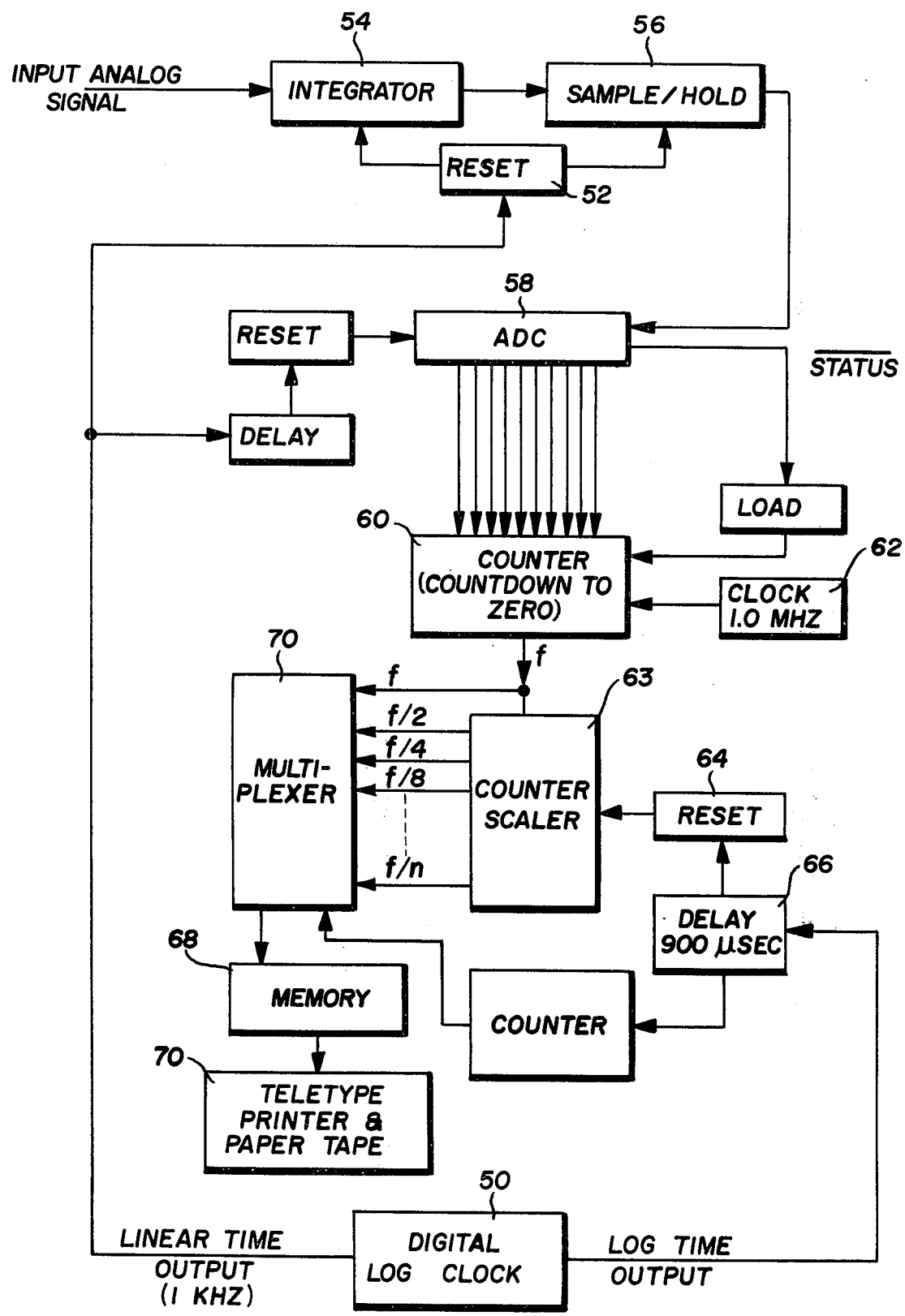

FIG. 5 illustrates in detail one embodiment of a digital logarithmic averager apparatus in accordance with one aspect of the present invention. It is to be understood that the apparatus illustrated in FIG. 5 is of standard construction, that is, each individual component being well known in the art. It is of course preferred that integrated circuits be used as the actual devices and as an example one may utilize the integrated circuits of the TTL-74 series logic circuits readily available. A digital log clock 50 provides the linear output such as a one-KHz clock rate into a reset 52 in order to integrate and sample through integrator 54 and sample/hold circuit 56 the input analog signal. The output of the sample/hold circuit 56 is in serial form and is coupled into an analog digital converter 58.

The output of ADC 58 is a digital number which corresponds to the analog input. The output of ADC 58 is loaded in parallel into a 12-bit counter 60 using the $\overline{\text{STATUS}}$ of the ADC for a loading command. After the number is loaded into counter 60, the $\overline{\text{STATUS}}$ going high starts a 1.0 MHz clock 62 which couples into the 12-bit counter 60 and causes the counter to count down to zero. It is to be noted that the clock 62 is free-running and is switched in and out of the circuit when given proper commands; such commands are readily provided for and have not been illustrated in FIG. 5 in order to avoid encumbering the drawing.

When counter 60 has counted to zero, it provides a pulse which shuts off clock 62. A system of four inverters (not shown) prevents the clock 62 from starting and stopping in the middle of a pulse. Otherwise, the clock could put out a very short pulse which would disrupt the counter 60. A string of pulses (equal in number to the output of the ADC 58) is coupled into a scaling counter 63 every 1 msec, assuming the linear output of log clock 50 is 1 KHz. Scaler counter 63 counts all pulses received between two reset commands from a reset unit 64. The reset unit 64 resets counter 63 at logarithmically varying time intervals determined by the log output of digital log clock 50 delayed about 900 microseconds by delay unit 66. The delay interval allows analysis of the previous 1-millisecond interval to be completed and sent to a memory unit 68. It is to be noted that the time intervals between which the scaler 63 is reset increases logarithmically by a factor of 2, that is, the time intervals between resets are $t_o$, $2t_o$, $4t_o$, $8t_o$, etc.

In order to prevent the digital numbers which are loaded into the memory unit 68 from increasing by factors of two for each time interval, a multiplexor 70 looks at different bit-outputs of the scaling counter 62. When the time interval increases by a factor of two, the multiplexor 70 divides the number of counts by a factor of two. The output of memory 68 is coupled into an output device 70 such as a teletype unit or a computer.

It is to be understood, of course, that whereas the present invention has been described in connection with the study of biological molecules, the principles of the digital logarithmic averager can as well be applied to the investigation of any time-varying process over long time bases without loss of resolution. Thus, the principle of the present invention is also applicable to studies in pulse radiolysis, radiation damage, fluorescence, diffusion, annealing, luminescence, etc.

The foregoing detailed description has been given for clearness of understanding only, and no unnecessary limitations should be understood therefrom, as modifications will be obvious to those skilled in the art.

What is claimed is:

1. A method of analyzing a kinetic action comprising the steps of:
   providing periodic digital samples of information sensed during said kinetic action; and
   averaging said periodic digital samples of information over exponentially increasing time intervals to obtain measurements of said kinetic action over several time decades.

2. The method of claim 1, wherein said averaging is provided over time intervals increasing by the power of two.

3. A method of analyzing a kinetic action comprising the steps of:

sensing said kinetic action and providing a corresponding output signal;
periodically integrating said output signal over time segments of discrete length to provide periodic information samples related to said kinetic action;
converting said periodic information samples into a digital signal; and
averaging said periodic information samples over exponentially increasing time intervals each corresponding to a plurality of said linear time segments.

4. The method of claim 3, wherein said averaging is provided over time intervals increasing by the power of two.

5. The method of claim 3, wherein said averaging includes the steps of:
summing said periodic information samples over time intervals increasing by the power of two; and
dividing said sum for each time interval by the corresponding number of said time segments of discrete length in each of said respective time intervals.

6. Apparatus for analyzing information sensed during a kinetic action comprising:
means for providing periodic digital samples of said information; and
means for averaging said periodic digital samples of information over exponentially increasing time intervals.

7. Apparatus for analyzing information sensed during a kinetic action comprising:
means for periodically integrating said information over discrete linear time segments to provide periodic information samples;
means for converting said periodic information into a digital signal;
means for summing said periodic information samples over time intervals increasing by the power of two; and
means for dividing said sum for each of said time intervals by the corresponding number of said time segments in each of said respective time intervals.

8. Apparatus for analyzing information sensed during a kinetic action comprising:
means for sensing said kinetic action and providing a corresponding output signal;
means for periodically integrating said output signal over time segments of discrete length to provide periodic information samples related to said kinetic action;
means for converting said periodic information samples into a digital signal; and
means for averaging said periodic information samples over exponentially increasing time intervals each corresponding to a plurality of said linear time segments.

9. Apparatus as claimed in claim 8, including means for averaging said periodic information samples over time intervals increasing by the power of two.

* * * * *